United States Patent [19]
Cheng

[11] 3,884,072
[45] May 20, 1975

[54] FLOW MEASURING APPARATUS HAVING A COLORIMETRIC URINE INDICATOR

[75] Inventor: Shu-Sing Cheng, Hanover Park, Ill.

[73] Assignee: The Kendall Company, Walpole, Mass.

[22] Filed: May 14, 1973

[21] Appl. No.: 360,235

[52] U.S. Cl............. 73/215; 23/253 R; 23/253 TP
[51] Int. Cl......................... G01f 1/00; G01n 33/16
[58] Field of Search...... 23/253 TP, 253 R, 253 US, 23/230 B; 116/114 AM; 4/1, 110, 112; 73/194 R, 215, 198

[56] References Cited
UNITED STATES PATENTS

| | | | |
|---|---|---|---|
| 1,042,097 | 10/1912 | Englebright............................ | 73/215 |
| 2,165,705 | 7/1939 | Houser................................. | 73/215 |
| 2,648,981 | 8/1953 | Drake.................................. | 73/215 |
| 3,058,353 | 10/1962 | Irwin................................... | 73/428 |
| 3,434,801 | 3/1969 | Scherr............................. | 23/253 TP |
| 3,447,904 | 6/1969 | Rupe............................ | 23/253 TP X |
| 3,466,145 | 9/1969 | Van Duyne...................... | 23/253 TP |
| 3,753,652 | 8/1973 | Gassmann et al........... | 23/253 TP X |
| 3,768,978 | 10/1973 | Grubb et al................. | 23/253 TP X |

FOREIGN PATENTS OR APPLICATIONS

| | | | |
|---|---|---|---|
| 94,707 | 5/1922 | Switzerland............................ | 73/215 |
| 591,987 | 1/1934 | Germany .............................. | 73/215 |

OTHER PUBLICATIONS

Henry, Clinical Chemistry Principles and Technics, p. 350-351, (1964), RB40.H4.

Primary Examiner—Joseph Scovronek
Attorney, Agent, or Firm—Ellen P. Trevors; Powell L. Sprunger

[57] ABSTRACT

An indicator for the colorimetric detection of urine in combination with an apparatus for measuring the approximate peak flow rate of a liquid discharge is disclosed. The indicator comprises an absorbent carrier bearing an indicating chemical which undergoes an irreversible color change upon exposure to one or more of the ions present in urine.

8 Claims, 5 Drawing Figures

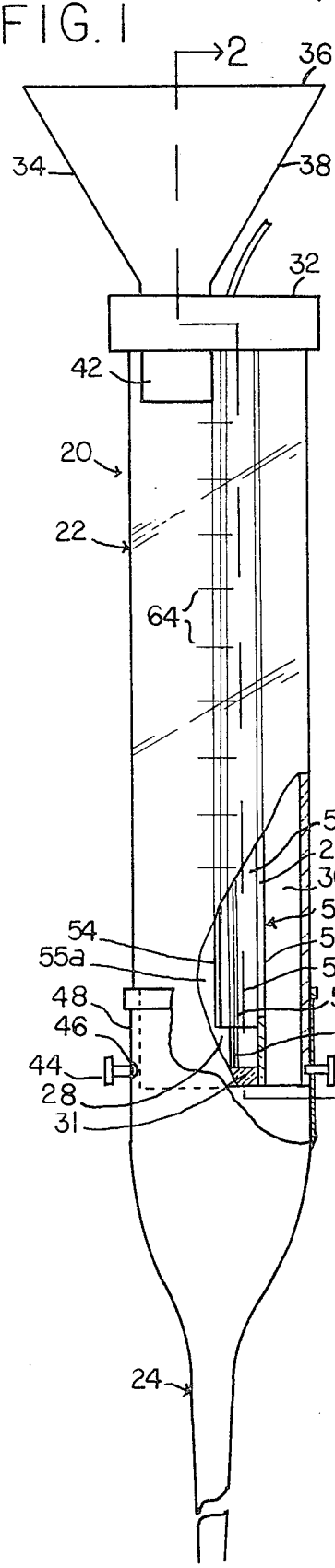

FLOW MEASURING APPARATUS HAVING A COLORIMETRIC URINE INDICATOR

This invention relates to a colorimetric urine indicator for use in combination with an apparatus for measuring the approximate peak flow rate of a liquid discharge. More specifically, this invention utilizes an indicator comprising an absorbent carrier bearing an indicating chemical which undergoes an irreversible color change upon exposure to one or more of the ions present in urine.

Paper indicators impregnated with chemicals designed to permit screening for abnormalities in urine have long been known in the art. Thus, it is conventional to detect albumin, protein, Glucose, bilirubin, ketone bodies, hemoglobin, phenylpyruric acid etc. by immersing an appropriate indicator strip in a urine sample.

Various apparati for obtaining data pertaining to liquid discharge are well-known in the art. Thus, devices are used to obtain such data as total volume, average flow rate, cast distance, velocity, configuration of the stream, etc.; the information generally being obtained by observation of the natural voiding of urine by patients.

Recently, a series of apparati of simplified construction for measuring the approximate peak flow rate of a liquid discharge, and which may be self-administered by a patient, have been discovered. These apparati are fully described in applications Ser. No. 360,214 "Flow Measuring Apparatus," invented by John F. Dye, William J. Binard and leonard R. Anglada; Ser. No. 360,217 "Flow Measuring Device," invented by Anthony J. Ciarico; and Ser. No. 360,218 "Apparatus for Measuring a Liquid Discharge," invented by John F. Dye, William J. Binard and Leonard R. Anglada; all applications being assigned to the assignee of the present application and being filed concurrently herewith. The aforementioned applications are incorporated herewith in their entirety.

Now it has been found in accordance with this invention that data on urine can be readily obtained by employing an indicator for one of the normal ionic constituents of urine in conjunction with an apparatus for measuring the approximate peak flow rate of a liquid discharge.

The invention will be better understood by reference to the following description thereof, in which the apparatus is as described in aforementioned application Ser. No. 360,214 and the accompanying drawings in which:

FIG. 1 is a fragmentary elevational view, partly broken away, of a flow measuring apparatus in combination with a colorimetric urine indicator illustrating this invention;

FIG. 2 is a fragmentary elevational view, partly broken away, and taken partly in section substantially as indicated along the line 2—2 of FIG. 1;

FIG. 3 is a sectional view taken substantially as indicated along the line 3—3 of FIG. 2;

FIG. 4 is a fragmentary perspective view of the lower internal structure of the flow measuring apparatus showing the lower portion of an upright wall, shield, flange, and indicating strip.

FIG. 5 is a fragmentary perspective view of the lower internal structure of the flow measuring apparatus showing the lower portion of an upright wall, shield, flange, and indicating strip.

Referring now to FIGS. 1 and 2, there is shown an apparatus, generally designated 20, for measuring a discharge of liquid. The apparatus 20 includes a hollow receptacle designated generally 22 and a container or bag designated generally 24 removably secured to the receptacle 22. However, if desired, the container 24 may be made integral with the receptacle at its lower end. Preferably, the receptacle and container are made from a suitable transparent material, such as plastic.

As illustrated in FIGS. 1–3, and 5, the receptacle 22, which is preferably cylindrically shaped, has an upright wall 26 which extends laterally across the inside of the receptacle and which extends vertically the height of the receptacle. The upright wall 26 separates the inside of the receptacle 22 into a compartment 28 and a channel 30. The lower end of the compartment 28 is closed by a bottom wall 31, while a cap 32 covers the upper end of the receptacle 22. If desired, the cap 32 may be removably secured to the upper end of the receptacle to provide access to the inside of the receptacle.

As shown in FIGS. 1, 2, and 4, the receptacle 22 has a funnel-shaped member 34 adjacent its upper end which defines an inlet port 36 to receive a liquid discharge, and which has a tapered portion 38 and a lower depending portion 42 to direct the discharge into the inside of the receptacle. The cap 32 has an aperture 40 to removably receive the lower depending portion 42 of the funnel-shaped member 34. The positional relationship of the funnel-shaped member 34 to the inside of the receptacle 22 is best shown in FIG. 3. As shown, the compartment 28 of the receptacle 22 is positioned below the depending portion 42 and the inlet port 36, such that liquid passes through the funnel-shaped member 34 into the compartment 28.

As shown in FIGS. 1–3, the receptacle 22 has a plurality of outwardly projecting bosses 44, and the container 24 has a plurality of corresponding apertures 46 in the sides of an upper tubular section 48 of the container 24. Thus, the lower end of the receptacle 22 may be inserted into the upper tubular section 48 of the container 24, and the bosses 44 are received in the apertures 46 to removably secure the container 24 to the lower end of the receptacle 22.

As illustrated in FIGS. 1–3, and 5, the upright wall 26 has opening means, generally designated 50, which preferably comprises a vertical slot 52 having parallel sides, communicating between the compartment 28 and the channel 30. Preferably, the slot 52 or opening means is spaced slightly from the lower end of the receptacle 22, as shown.

A shield 54 is secured to the upright wall 26 in the compartment 28. The shield 54 is spaced from and covers the slot 52, in order to prevent liquid which enters the compartment from splashing against the slot 52. The shield 54 is spaced from the lower end of the receptacle 22 or the bottom wall 31 to permit passage of liquid under the lower end of the shield 54 to the slot 52. The shield 54 extends vertically in the compartment 28 at least coextensive with the vertical length of the slot 52. However, the shield 54 preferably extends to the upper end of the upright wall 26 or compartment 28 to prevent the inadvertent passage of liquid over the top of the shield 54. Although, for convenience, the shield 54 is shown as a semi-cylinder, it is understood that the shield 54 may have any suitable shape which prevents splashing of incoming liquid against the slot 52, and the shield 54 may be secured to the side walls of the receptacle 22, rather than the upright wall 26 itself, if desired.

As shown, the shield 54 separates the compartment 28 into a first chamber 55a positioned to receive the discharge passing through the inlet port 36 and into a second chamber 55b, which communicates with the first chamber 55a adjacent its lower end. It is readily apparent that the chambers 55a and b may be formed individually, such that they are separated by means other than a wall, i.e., other than the shield shown in the drawings, with a passageway communicating between the two chambers adjacent their lower ends. For example, the chambers 55a and b may be defined by separate tubes which are connected by a passageway adjacent their lower ends.

A flange 56 is secured to the shield 54 intermediate the shield 54 in the upright wall 26. The flange 56 is spaced from the lower end of the receptacle 22 or the bottom wall 31, and defines, with the shield 54, a vertical passageway 58. Preferably, the flange 56, as well as the shield 54, extends to the upper end of the receptacle, to prevent incoming liquid from entering the upper end of the passageway 58, whereas liquid is free to enter the passageway 58 through its lower end, since both the shield 54 and flange 56 are spaced from the lower end of the receptacle 22 in the compartment 28.

As shown in FIGS. 2 and 4, the cap 32 has an aperture 60 positioned above the upper end of the passageway 58 for insertion of an indicating strip 62 through the aperture 60 and into the passageway 58 from above. As illustrated in FIGS. 1–3, and 5, the indicating strip 62 is pushed downwardly through the passageway 58 until the bottom of the strip 62 is positioned adjacent the lower end of the receptacle 22, and the strip 62 preferably has a length corresponding to at least the height of the receptacle to facilitate insertion and removal of the strip. The indicating strip 62 is sensitive to contact by urine, as described below, and since liquid enters the passageway 58 through its lower end, the indicating strip 62 provides an indication of the maximum height liquid reaches in the passageway 58 and the compartment 28 during the liquid discharge.

Indicating strip 62 is made of any suitable absorbent material, such as paper or cardboard. The strip is impregnated with a chemical which undergoes an irreversible color change when exposed to one or more of the ions present in normal urine. Preferably the strip is provided with indicia 66 for reading total volume and/or maximum height.

In operation, the receptacle is positioned to receive a discharge of liquid, such as a urine stream during voiding, through the inlet port 36. As the liquid discharge passes into the receptacle through the inlet port 36, the tapered portion 38 and depending portion 42 direct the discharge into the compartment 28. As the discharge continues, the liquid collects in the lower part of the compartment 28 until it reaches the height of the lower end of the slot 52, and once the height of the liquid in the compartment 28 further rises, the liquid begins to pass through the lower end of the slot 52 into the channel 30. The liquid then drains through the lower end of the channel 30 into the container 24 for collection.

For a given rate of flow of the discharge into the receptacle the liquid attains a fixed height in the compartment 28, and the liquid passes at a fixed rate of flow through the slot 52. Hence, if the rate of flow of the liquid discharge into the receptacle increases, the height of liquid in the compartment rises an additional amount, and the rate of flow through the slot 52 also increases, since the liquid flows through a larger vertical portion of the slot 52. Thus, as long as the rate of flow of the discharge into the receptacle increases, the height of liquid in the compartment 28 continues to rise, and the rate of flow of liquid through the slot 52 also increases. When the flow rate of the incoming discharge abates, the liquid drains from the compartment 28 into the channel 30 faster than it enters the compartment, and the height of the liquid in the compartment begins to subside.

Peak flow rate of the incoming liquid discharge may be defined as the maximum rate of flow of the discharge. Since the height of liquid in the compartment rises or lowers responsive to an increase or decrease, respectively, of the flow rate of the incoming discharge, it is apparent that the maximum height of liquid attained in the compartment during the discharge serves as an indication of the approximate peak flow rate of the discharge. Although anomalies in the discharge, such as a momentary surge of the discharge, may not be ultimately reflected in the maximum liquid height in the compartment, due, in part to the lag between the time the discharge enters the receptacle and the time it enters the compartment, the apparatus determines the peak flow rate with sufficient accuracy for such purposes as are under discussion. In particular, a urine stream during voiding has a relatively slow rate of change of flow rate, and apparatus of the present invention indicates a peak flow rate for the discharge which is sufficiently accurate for purposes of diagnosing a patient.

It is possible that the approximate peak flow rate of the urine discharge may be determined by observing the highest level of liquid accumulated in the compartment 28 during the discharge. Direct reading by the patient may be impractical or difficult during self-administration of the apparatus as thus far described, if the apparatus is utilized to collect a discharge of liquid during voiding, and it is desirable that the apparatus be self-administered by the patient in order to alleviate any psychological problems of the patient which might be caused by observation of the receptacle during voiding.

Accordingly, the assembly comprising a wall portion defined by the shield 54 and flange 56 and the indicating strip 62, has been provided to automatically record the approximate maximum height of liquid collected in the compartment 28 during the liquid discharge. Since liquid in the compartment 28 passes into the lower end of the passageway 58, the maximum liquid height attained in the compartment 28 during the liquid discharge is also proportionately reached in the passageway 58, which is indicated by a color contrast on the indicating strip 62. After the liquid discharge has been completed, a direct reading of the approximate peak flow rate may be determined by inidicia 64 on the receptacle, as shown in FIG. 1, or by indicia 66 on the indicating strip 62 itself, as shown in FIG. 5.

It is apparent that the rate of drainage from the compartment 28 into the channel 30 is partly dependent upon the precise structure of the receptacle 22. For example, although the opening means 50 is shown as a vertical slot 52 having parallel sides, it is contemplated that the slot may be widened or narrowed at desired vertical positions to increase or decrease the flow rate of liquid through the wall 26 in that area, and the wall 26 may have a plurality of slots if desired. Also, the cross-sectional area of the compartment 28 itself may be selected of a suitable size to provide the desired sensitivity of liquid column height for a more accurate determination of the peak flow rate.

It is contemplated that a particular structure for the receptacle would first be established, dependent on the accuracy desired and the expected range of values for the peak flow rate of the liquid discharge. Next the receptacle could be calibrated against known constant flow rates of a discharge passing into the receptacle to determine the appropriate location for the indicia 64 or 66 on the receptacle or the strip. That this may be readily accomplished is apparent from the fact that the peak flow rate for a discharge having a constant flow rate is the value of the constant flow rate itself. Accordingly, when the discharge of constant flow rate is directed into the receptacle, liquid rises in the compartment to a level at which liquid entering the compartment is offset by the liquid draining from the compartment into the channel, and the receptacle is marked at this height for peak flow rate by the value of the flow rate of the constant discharge.

Although the passageway 58 is shown as being located intermediate the shield 56 and the upright wall 26, it is apparent that the passageway could be located at various other positions in the compartment 28. For example, the passageway could be located on the outside of the shield 54, relative the wall 26, or on the inside of the side wall of the receptacle 22 in the compartment 28. However, the indicating strip 62 should remain protected from premature contact by the incoming liquid into the compartment, while liquid should be permitted to pass into the lower end of the passageway, as discussed above.

In the event that the rate of flow of the incoming discharge is sufficiently abnormal, such that its flow rate greatly exceeds the value which has been expected, an enlarged opening 68 is provided in the upright wall 26 adjacent its upper end for rapid passage of liquid from the compartment 28 into the channel 30. Thus, overflow of the liquid out of the receptacle is prevented. The indicating strip 62 will provide an indication that the incoming discharge is abnormally high and that an overflow condition has occurred, since the indicating strip will change color contrast to a vertical height corresponding to the opening 68.

As noted above, once the rate of flow of the liquid discharge into the receptacle abates, the height of the liquid in the compartment 28 subsides, and the approximate peak flow rate has already been determined on the indicating means. During the remainder of the liquid discharge, the liquid continues to drain from the compartment 28 into the channel 30 until the discharge is terminated and drainage from the compartment to the channel eventually stops. Since the liquid drains from the channel 30 of the receptacle 22 into the container 24, the volume of liquid which collects in the container 24 during the liquid discharge may readily be determined by indicia on the container 24. If the lower end of the slot 52 is spaced above the bottom wall 31 of the receptacle and some liquid remains in the compartment 28 after drainage from the compartment has been completed, the calibration of volume measurements on the container 24 may be adjusted to take into account a constant volume of residual liquid which remains in the compartment 28 after the discharge has been completed.

Since the patient may use the device without observation, unnatural voiding or failure to void which normally occur from psychological diffculties when a patient voids under observation are prevented. After voiding, the patient merely summons the physician or nurse, who first determines the peak flow rate and the total volume of the liquid discharge as indicated by the respective indicia on the receptacle and container. If it is desired to reuse the measuring apparatus 20, the cap 32 may be removed from the receptacle 22, and any residual liquid remaining in the compartment 28 may be removed. Also, the container 24 may be removed from the receptacle 22 for disposal of the liquid in the container or for taking a specimen.

The indicating chemical used in the practice of this invention can be any compound or compounds capable of undergoing an irreversible color change upon exposure to ions in normal urine. It is not intended to limit the use of this invention to voiding of normal urine, providing the urine contains the normal components which would be required to effect the desired color change. By "irreversible color change" it is not intended to preclude a color change that lightens or darkens with time or exposure to air as long as the original color change remains observable. Furthermore, the change can be from colorless or white to a color and vice versa, as well as from one color to another. Exemplary chemicals which undergo the desired color change are listed in the table below; these chemicals are merely illustrative and are not intended to limit the scope of the invention:

TABLE

| Chemical | Color | Color after contact with urine |
|---|---|---|
| Silver Chromate | Brick red | White |
| Silver Dichromate | Brick red | White |
| Silver Phosphate | Gray | Brown |
| Silver Carbonate | Gray | Brown |
| Silver Oxide | Chocolate | Brown |
| Silver Perborate | Black | Chocolate |
| Silver Periodate | Brown | White |
| Silver Fluoride | Gray | White |
| Sodium Cobaltinitrite | Brown | Lemon Yellow |

It should be noted that all of the above chemicals with the exception of sodium cobaltinitrite undergo the specified color change because of the presence of chloride ions in urine; the color change for sodium cobaltinitrite is due to the presence of potassium ions in urine. However, since these chemicals are merely illustrative, any chemical undergoing a change in the presence of any other ion in urine can be used. Furthermore, the strip of absorbent material can be impregnated, coated, printed etc. with the chemical. If desired, the strip can be affixed to plastic films, metal strips, etc. It is also feasible to incorporate other ingredients in the absorbent material such as surfactants, chemicals to enhance color developement, etc. An example of the latter is the use of cobalt acetate and sodium nitrite in order to effect the color change of sodium cobaltinitrite to dark brown. Besides detecting the presence of chloride or potassium ions, these indicators may be used as quantitative measuring devices to estimate the concentration of these ions in urine by comparing the intensity of the developed color with a color chart which correlates the color intensity to the concentration of the ions in question.

In the practice of this invention, it is preferred to employ a chemical which is resistant to ethylene oxide sterilization, particularly where the indicator will be packaged and sold in combination with an apparatus which is subsequently sterilized with ethylene oxide. By resistant to ethylene oxide is meant that the indicator will undergo no change, or a change that still provides for visual preception. Thus, silver chromate has been found to be effective after exposure to ethylene oxide, whereas sodium cobaltinitrite is not.

While the invention has been illustrated with respect to one type of flow measuring apparatus, it is intended to include any apparatus used to measure peak flow rate of liquid discharge within the scope of this invention, including but not limited to the aforementioned apparati, described in applications copending and assigned to the assignee of this invention. Thus, other modifications and design changes are also contemplated which are within the spirit and scope of the appended claims. We claim:

1. A device for measuring the approximate peak flow rate of a urine discharge, comprising: a receptacle having a cavity and an inlet port adjacent an upper end of the receptacle for passage of the urine discharge into the cavity, and a weir having opening means for passage of urine from the cavity through the opening means, said device including an indicating strip for measuring the approximate maximum height of urine collected in said cavity, said strip comprising an absorbent carrier bearing an indicating chemical which undergoes an irreversible color change upon exposure to the chloride ions present in urine.

2. The device of claim 1 wherein said absorbent carrier is a strip of paper or cardboard calibrated to allow reading of maximum height of urine in said apparatus.

3. The device of claim 1 wherein said indicating chemical is a silver salt selected from the group consisting of silver chromate, silver dichromate, silver phosphate, silver carbonate, silver oxide, silver perborate, silver periodate and silver fluoride.

4. A device for measuring the approximate peak flow rate of a urine discharge, comprising; a receptacle having a cavity and an inlet port adjacent an upper end of the receptacle for passage of the urine discharge into the cavity, and a weir having opening means for passage of urine from the cavity through the opening means, said device including an indicating strip for measuring the approximate maximum height of urine collected in said cavity, said strip comprising an absorbent carrier bearing an indicating chemical which undergoes an irreversible color change upon exposure to the potassium ions in urine.

5. The device of claim 4 wherein said indicating chemical is sodium cobaltinitrite.

6. A device for measuring the approximate peak flow rate of a urine discharge, comprising: a receptacle having a cavity and an inlet port adjacent an upper end of the receptacle for passage of the urine discharge into the cavity, and a weir having opening means for passage of urine from the cavity, through the opening means, said device including an indicating strip for measuring the approximate maximum height of urine collected in said cavity, said strip comprising an absorbent carrier bearing an indicating chemical which undergoes an irreversible color change upon exposure to one or more of the ions present in urine, and said indicating chemical is resistant to ethylene oxide.

7. The device of claim 6 wherein said indicating chemical is silver chromate.

8. A device for measuring the approximate peak flow rate of a urine discharge, comprising: a receptacle having a cavity and an inlet port adjacent an upper end of the receptacle for passage of the urine discharge into the cavity, and a weir having opening means for passage of urine from the cavity through the opening means, said device including a sterile indicating strip for measuring the approximate maximum height of urine collected in said cavity, said strip comprising an absorbent carrier bearing an indicating chemical which undergoes an irreversible color change upon exposure to one or more of the ions present in urine, said indicating chemical being resistant to ethylene oxide.

* * * * *